United States Patent
Blumberg et al.

(10) Patent No.: US 8,005,331 B2
(45) Date of Patent: Aug. 23, 2011

(54) SURFACE-PLASMON-ASSISTED OPTICAL FREQUENCY CONVERSION

(75) Inventors: Girsh Blumberg, New Providence, NJ (US); Aref Chowdhury, Berkeley Heights, NJ (US)

(73) Assignee: Alcatel Lucent, Paris (FR)

(*) Notice: Subject to any disclaimer, the term of this patent is extended or adjusted under 35 U.S.C. 154(b) by 0 days.

(21) Appl. No.: 13/018,997

(22) Filed: Feb. 1, 2011

(65) Prior Publication Data
US 2011/0128614 A1    Jun. 2, 2011

Related U.S. Application Data

(63) Continuation of application No. 12/368,792, filed on Feb. 10, 2009, now Pat. No. 7,920,766.

(51) Int. Cl.
  *G02B 6/00*    (2006.01)
  *G02B 6/12*    (2006.01)
(52) U.S. Cl. .............. 385/122; 385/10; 385/14; 385/37; 385/131; 359/332; 372/22
(58) Field of Classification Search .............. 385/2, 8, 385/10, 14, 37, 122, 129–132; 359/326–332; 372/21–22
See application file for complete search history.

(56) References Cited

U.S. PATENT DOCUMENTS

| | | | |
|---|---|---|---|
| 4,765,705 A | 8/1988 | Seymour et al. | |
| 5,011,250 A | 4/1991 | Okada et al. | |
| 5,067,788 A | 11/1991 | Jannson et al. | |
| 5,073,725 A | 12/1991 | Takano et al. | |
| 6,034,809 A | 3/2000 | Anemogiannis | |
| 6,865,209 B2 | 3/2005 | Ungar et al. | |
| 7,027,689 B2 | 4/2006 | Blumberg et al. | |
| 7,039,277 B2 | 5/2006 | Blumberg et al. | |
| 7,039,315 B2 | 5/2006 | Blumberg et al. | |
| 7,054,528 B2 | 5/2006 | Blumberg | |
| 7,099,073 B2 | 8/2006 | Chowdhury et al. | |
| 7,218,817 B2 | 5/2007 | Magnusson et al. | |
| 7,471,852 B2 | 12/2008 | Hamada | |
| 7,920,766 B2 * | 4/2011 | Blumberg et al. | 385/122 |
| 2005/0058425 A1 | 3/2005 | Berini et al. | |
| 2005/0244159 A1 | 11/2005 | Chowdhury et al. | |
| 2006/0210993 A1 | 9/2006 | Chowdhury et al. | |
| 2006/0269292 A1 | 11/2006 | Chowdhury et al. | |

OTHER PUBLICATIONS

Zhang, De-Long, et al., "Characterization of Near-Stoichiometric Ti:LiNbO3 Strip Waveguides with Varied Substrate Refractive Index in the Guiding Layer," Journal of the Optical Society of America, A/vol. 25, No. 10, Oct. 2008, pp. 2558-2570.

Barnes, William L., et al., "Surface Plasmon Subwavelength Optics," Nature Publishing Group, Nature, vol. 424, Aug. 14, 2003, pp. 824-830.

Yariv, Amnon, "Optical Electronics in Modern Communications," 5th edition, Oxford University Press, 1997, ISBN 13: 9780195106268, pp. 318-325.

(Continued)

*Primary Examiner* — Daniel Petkovsek
(74) *Attorney, Agent, or Firm* — Mendelsohn, Drucker & Associates, P.C.; Yuri Gruzdkov; Steve Mendelsohn

(57) ABSTRACT

A frequency-conversion method that uses a nonlinear optical process to transfer energy between a surface-plasmon (SP) wave that is guided along an electrically conducting strip and a light beam that is guided along an optical waveguide whose core is adjacent to the electrically conducting strip. A periodic structure spatially modulates the nonlinear susceptibility of the waveguide core with a spatial period that is related to a momentum mismatch in the nonlinear optical process. The spatial modulation provides quasi-phase matching for the SP wave and the light beam and enables efficient energy transfer between them.

11 Claims, 3 Drawing Sheets

OTHER PUBLICATIONS

Restriction Requirement received in U.S. Appl. No. 12/368,792, filed Feb. 10, 2009, mailed on Jan. 27, 2010.
Non-Final Office Action received in U.S. Appl. No. 12/368,792, filed Feb. 10, 2009, mailed on Apr. 13, 2010.
Ex parte Quayle received in U.S. Appl. No. 12/368,792, filed Feb. 10, 2009, mailed on Sep. 29, 2010.
Notice of Allowability received in U.S. Appl. No. 12/368,792, filed Feb. 10, 2009, mailed on Dec. 1, 2010.

* cited by examiner

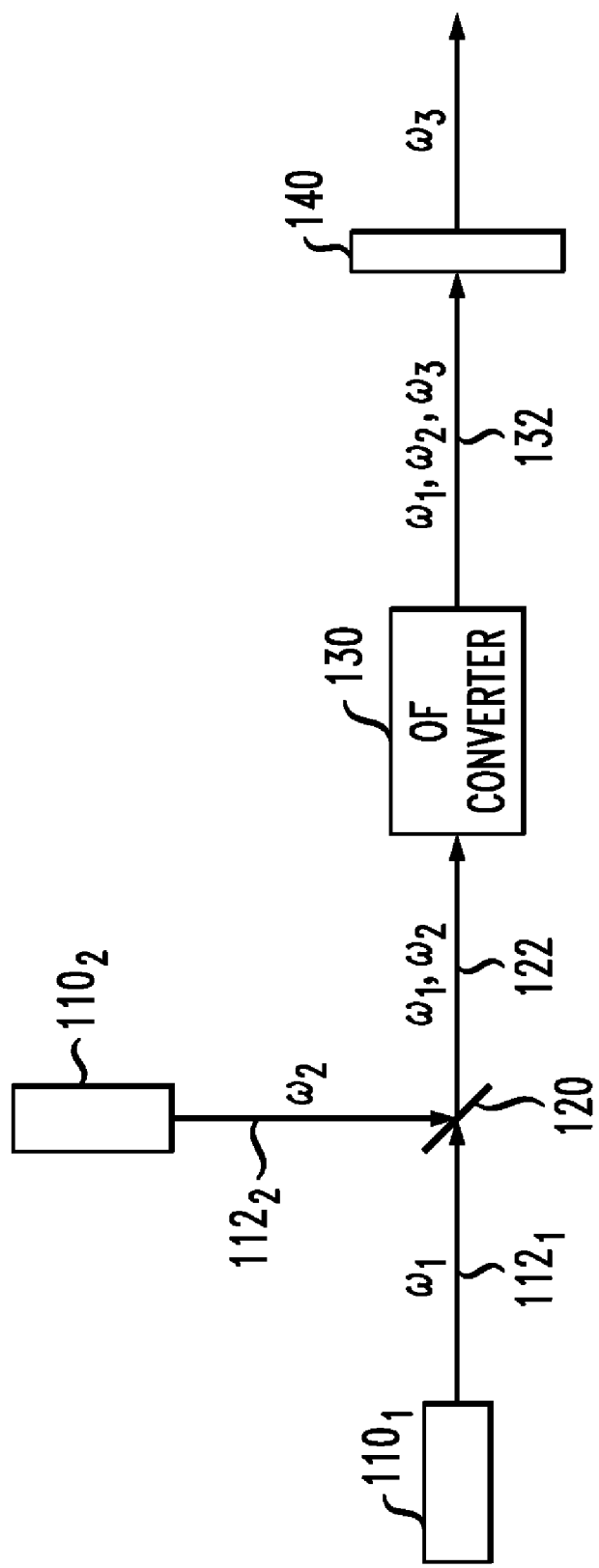

200

250

AA

SURFACE-PLASMON-ASSISTED OPTICAL FREQUENCY CONVERSION

CROSS-REFERENCE TO RELATED APPLICATIONS

This application is a divisional of U.S. patent application No. 12/368,792, filed Feb. 10, 2009, and entitled "Surface-Plasmon-Assisted Optical Frequency Conversion," which is incorporated herein by reference in its entirety.

BACKGROUND OF THE INVENTION

1. Field of the Invention

The present invention relates to nonlinear optical devices and, more specifically, to optical frequency converters.

2. Description of the Related Art

This section introduces aspects that may help facilitate a better understanding of the invention(s). Accordingly, the statements of this section are to be read in this light and are not to be understood as admissions about what is in the prior art or what is not in the prior art.

As used herein, the term "optical frequency conversion" refers to a process that converts light of one frequency (wavelength) into light of another frequency (wavelength). An optical frequency converter might use a nonlinear optical medium, in which one or more nonlinear optical processes transfer energy from one or more pump frequencies to a new (converted) frequency. The relevant nonlinear optical processes might include, but are not limited to, second-harmonic generation, sum-frequency generation, difference-frequency generation, frequency down-conversion, modulational interaction, Bragg scattering, and phase-conjugation.

One problem with optical frequency converters is that the choice of nonlinear optical materials suitable for use therein is limited. Furthermore, power-conversion efficiency provided by those nonlinear optical materials might not be optimal. It is therefore an ongoing effort to improve the power-conversion efficiency of optical frequency converters.

SUMMARY OF THE INVENTION

Provided are various embodiments of a frequency-conversion method that uses a nonlinear optical process to transfer energy between a surface-plasmon (SP) wave that is guided along an electrically conducting strip and a light beam that is guided along an optical waveguide whose core is adjacent to the electrically conducting strip. A periodic structure spatially modulates the nonlinear susceptibility of the waveguide core with a spatial period that is related to a momentum mismatch in the nonlinear optical process. The spatial modulation provides quasi-phase matching for the SP wave and the light beam and facilitates efficient energy transfer between them. Surface-induced enhancement of the electric field in the SP wave near the electrically conducting strip enables a representative method of the invention to advantageously provide a relatively high power-conversion efficiency.

According to one embodiment, provided is an apparatus having (i) an electrically conducting layer configured to guide an SP wave having at least a first frequency and (ii) an optical waveguide having a waveguide core configured to guide a light beam having a second frequency. The waveguide core is next to or in contact with the electrically conducting layer. The apparatus further has a periodic structure spatially modulating a nonlinear susceptibility of the waveguide core along a propagation direction.

According to another embodiment, provided is a frequency-conversion method having the steps of: (A) guiding a surface-plasmon (SP) wave having at least a first frequency along an electrically conducting layer; and (B) simultaneously guiding a light beam having a second frequency along an optical waveguide having a one-dimensional waveguide core and being located next to or in contact with the electrically conducting layer.

BRIEF DESCRIPTION OF THE DRAWINGS

Other aspects, features, and benefits of the present invention will become more fully apparent from the following detailed description, the appended claims, and the accompanying drawings in which:

FIG. 1 shows a block diagram of an optical generator according to one embodiment of the invention;

DETAILED DESCRIPTION

Figure 2A:
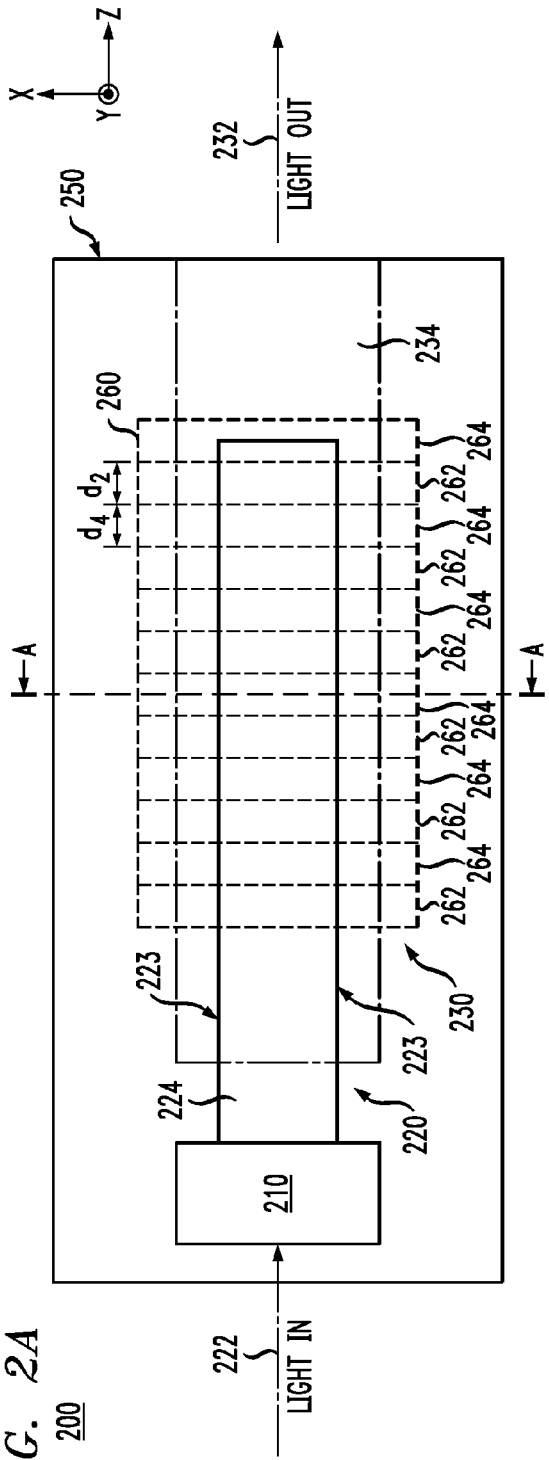
FIGS. 2A-C show an optical frequency converter that can be used in the optical generator of FIG. 1 according to one embodiment of the invention.

FIG. 1 shows a block diagram of an optical generator 100 according to one embodiment of the invention. Generator 100 has light sources $110_1$ and $110_2$ that generate light beams $112_1$ and $112_2$ having optical frequencies $\omega_1$ and $\omega_2$, respectively. A beam combiner 120 combines beams $112_1$ and $112_2$ and directs a resulting combined beam 122 to an optical frequency (OF) converter 130. Converter 130 has a nonlinear optical medium (not explicitly shown in FIG. 1), where optical frequencies $\omega_1$ and $\omega_2$ of beam 122 interact to produce at least one additional optical frequency, which is labeled $\omega_3$. An output light beam 132 produced by converter 130 generally has the original frequencies $\omega_1$ and $\omega_2$ and at least one new frequency $\omega_3$. An (optional) optical filter 140 that receives light beam 132 from converter 130 transmits frequency $\omega_3$ while blocking the other optical frequencies contained in that light beam.

The relationship between frequencies $\omega_1$, $\omega_2$, and $\omega_3$ depends on the type of nonlinear optical or frequency-mixing process occurring in converter 130. For example, if the nonlinear optical process is second-harmonic generation, then $\omega_3=2\omega_1$ or $\omega_3=2\omega_2$. If the nonlinear optical process is frequency down-conversion, then $\omega_3$ may be $\omega_1/2$, or $\omega_3$ may be $\omega_2/2$. One skilled in the art will appreciate that, for an embodiment of converter 130 that uses second-harmonic generation or frequency down-conversion, one of light sources $110_1$ and $110_2$ can be turned off or removed from the converter.

If the nonlinear optical process is sum-frequency generation, then $\omega_3=\omega_1+\omega_2$. If the nonlinear optical process is difference-frequency generation, then $\omega_3=\omega_1-\omega_2$, where $\omega_1>\omega_2$. If the nonlinear optical process is four-wave mixing, then, for example, $\omega_3=\omega_1+\omega_2-\omega_4$ or $\omega_3=\omega_1-\omega_2+\omega_4$. Various degenerate parametric conversion processes, in which at least two of frequencies $\omega_1$, $\omega_2$, $\omega_3$, and $\omega_4$ have the same value, are also possible.

In general, various nonlinear optical and/or frequency-mixing processes can be employed in converter 130. For example, in addition to or instead of the above-mentioned nonlinear optical processes, converter 130 can use one or more of the following processes/effects: third and higher harmonic generation, parametric frequency generation and down-conversion, optical rectification, four-wave mixing, an optical Kerr effect, Brillouin scattering, and Pockels effect.

Converter 130 operates by converting at least a portion of light beam 122 into surface plasmons (SPs). SPs, also often referred to as surface-plasmon polaritons, can propagate, e.g., along a metal-dielectric interface or along a metal-vacuum interface. An SP can be qualitatively viewed as a collective excitation that combines an electromagnetic wave and an associated propagating charge-density wave. The electromagnetic wave propagates along the interface due to its interaction with free surface charges of the metal. The interaction also causes the surface charges to oscillate in resonance with the electromagnetic wave. The combined collective physical excitation created via this resonant interaction, i.e., an entity including a charge-density wave and a corresponding electromagnetic wave, is an SP. A detailed description of certain physical properties of SPs can be found, e.g., in an article by W. L. Barnes, et al., entitled "Surface Plasmon Subwavelength Optics," published in Nature, 14 Aug, 2003, v. 424, pp. 824-830, the teachings of which are incorporated herein by reference in their entirety.

An SP wave, as its name implies, is a wave that is bound to a corresponding (e.g., metal-dielectric) interface. A component of the electric field that is orthogonal to the interface is at a maximum at the interface and decreases rapidly as the distance from the interface boundary increases. The characteristic (e-times) field attenuation length in the metal is on the order of the skin depth in that metal. The characteristic (e-times) field-attenuation length in the dielectric is on the order of one half of the wavelength of a free electromagnetic wave in that dielectric. For example, if the wavelength is about 1.5 μm, then there is a relatively strong evanescent field extending into the dielectric from the interface by at least about 0.8 μm.

Due to a phenomenon called surface-induced enhancement, an SP wave has a stronger electric field near the interface than a free or guided electromagnetic wave of comparable power. Converter 130 leverages this electric-field enhancement to achieve a relatively high power-conversion efficiency. More specifically, converter 130 uses the nonlinear dependence of an employed nonlinear optical process on the amplitude of the electric field to translate the presence of a relatively intense electromagnetic field near the metal-dielectric interface into a relatively high power-conversion efficiency. Advantageously, the power-conversion efficiency provided by a representative embodiment of converter 130 can be greater than that of a prior-art optical frequency converter, e.g., possibly by about 10 to 1000 times.

Figure 2C:
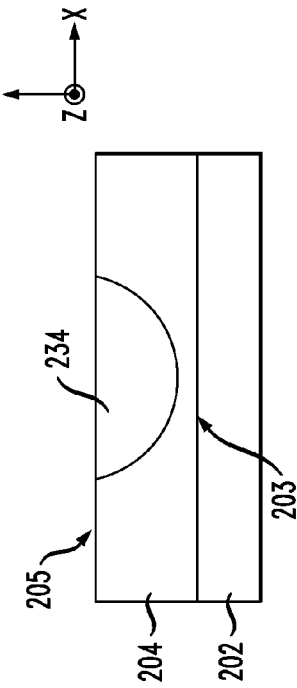
Figure 2B:
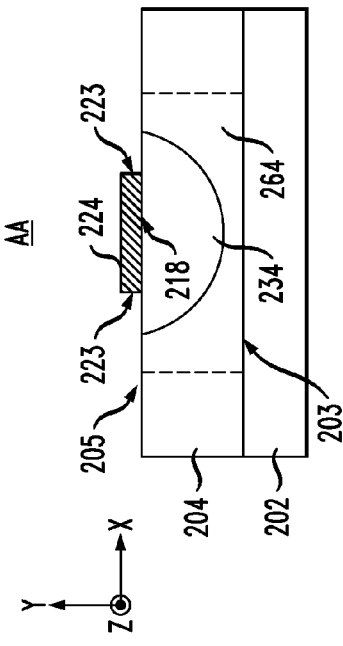

FIGS. 2A-C show an optical frequency converter 200 that can be used as converter 130 of FIG. 1 according to one embodiment of the invention. More specifically, FIG. 2A shows a top view of converter 200. FIG. 2B shows a cross-sectional view of converter 200 along a plane labeled AA in FIG. 2A. FIG. 2C shows a front view of an end face 250 of converter 200. In one embodiment, converter 200 is a planar waveguide circuit formed on a substrate layer 202.

Converter 200 has a photon-to-SP (PSP) converter 210 that receives an incident pump-light beam 222 (which can be, e.g., beam 122 of FIG. 1), typically at an oblique incidence angle. PSP converter 210 converts at least a portion of beam 222 into a corresponding SP wave, which is launched in the Z direction along an SP waveguide 220. SP waveguide 220 has a metal stripe 224 in contact with a dielectric layer 204. An interface 218 between stripe 224 and layer 204 provides a propagation conduit for the SP wave(s) produced by PSP converter 210. Edges 223 of stripe 224 laterally confine the SP wave(s) and enable SP waveguide 220 to guide them in the Z direction.

PSP converter 210 can be, e.g., one of the PSP converters disclosed in U.S. Pat. Nos. 7,027,689, 7,039,277, and 7,039,315, which are incorporated herein by reference in their entirety. PSP converter 210 might have two subsections (not explicitly shown in FIG. 2), each optimized for a specific frequency (wavelength). For example, one of the subsections is optimized for frequency $\omega_1$ while the other subsection is optimized for frequency $\omega_2$. Such different optimizations may include incorporating into PSP converter 210 one or more regular arrays of perturbing structures formed on the metal surface and/or in the adjacent dielectric layer, wherein the spacing between the perturbing structures in the regular array intended for receiving light of frequency $\omega_1$ is different from the spacing between the perturbing structures in the regular array intended for receiving light of frequency 107 $_2$. In one embodiment, the two subsections of PSP converter 210 are coupled to SP waveguide 220 in series. In an alternative embodiment, the two subsections of PSP converter 210 are coupled to SP waveguide 220 in parallel, e.g., using a V-shaped extension of stripe 224 (not explicitly shown in FIG. 2). In various embodiments, stripe 224 can be shaped to have one or more curved sections in the XZ plane to enable SP waveguide 220 to change, as appropriate or necessary, the propagation direction of the corresponding SP wave(s).

Converter 200 further has an optical waveguide 230 for guiding a light beam. In one embodiment, optical waveguide 230 has a semi-elliptical core 234 that can be formed, e.g., by doping a corresponding portion of dielectric layer 204. In one embodiment, core 234 enables substantially one-dimensional guiding of light due to which the light propagates along the longitudinal direction of optical waveguide 230. The "undoped" portion of dielectric layer 204 that is adjacent to core 234 is a cladding of optical waveguide 230. The index-of-refraction difference between core 234 and the adjacent undoped cladding portion of dielectric layer 204 provides lateral confinement for the light beam. A dopant-diffusion method that can be used to form core 234 is disclosed, e.g., in an article by De-Long Zhang, et al., entitled "Characterization of Near-Stoichiometric Ti:LiNbO$_3$ Strip Waveguides with Varied Substrate Refractive Index in the Guiding Layer," published in J. Opt. Soc. Am., 2008, vol. 25, No. 10, pp. 2558-2570, the teachings of which article are incorporated herein by reference in their entirety.

In an alternative embodiment, optical waveguide 230 might have a core that has a different (e.g., rectangular) cross-sectional shape. The optical waveguide might or might not have a solid dielectric cladding. For example, a raised dielectric structure having a Π- or Ω-shaped cross-section is capable of guiding light due to an index-of-refraction contrast present at its air-dielectric interface. Alternatively or in addition, a reflective (e.g., metal) coating can be used to confine light in the waveguide core.

In operation, the SP wave(s) launched by PSP converter 210 into SP waveguide 220 interact, as further described below, to cause energy of the SP wave(s) to be transferred to a light beam in optical waveguide 230. In effect, certain portions of SP waveguide 210 and optical waveguide 220 work together as an SP-to-photon (SPP) converter that converts at least a portion of the SP wave guided by SP waveguide 210 into light having a frequency that is different from the frequency (or frequencies) of input light beam 222. Optical waveguide 230 guides that light to end face 250, where the light exits converter 200 as an output light beam 232, which has the new (converted) frequency, such as frequency $\omega_3$ (see light beam 132 in FIG. 1).

Figure 3:
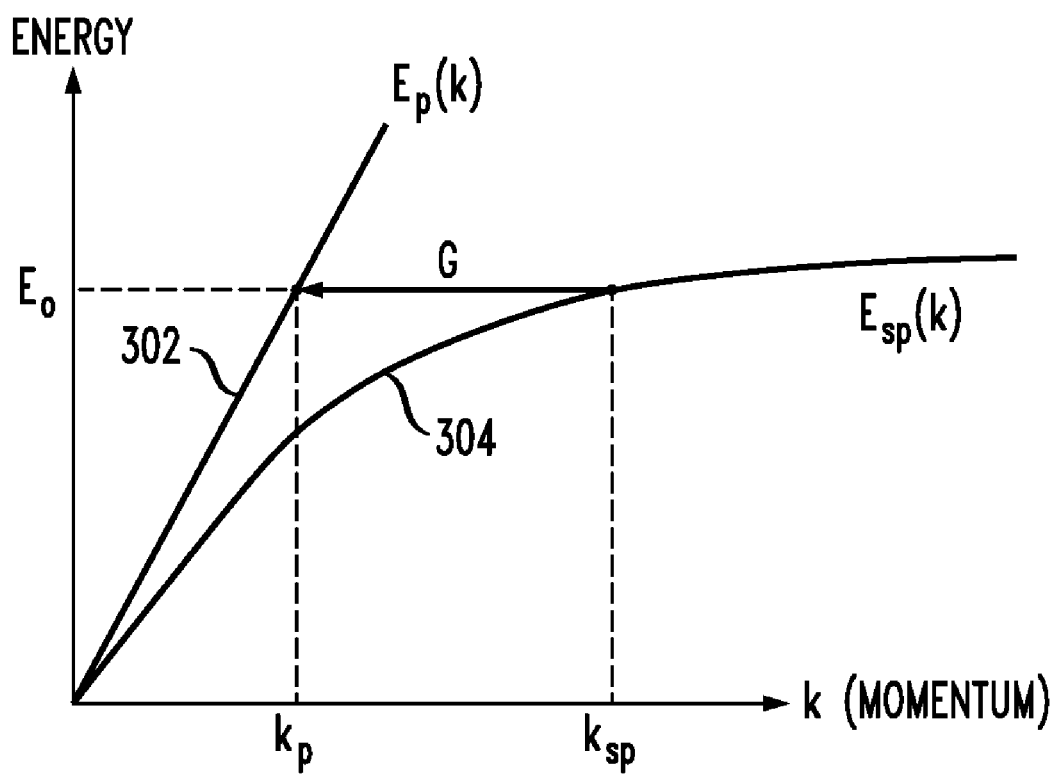
FIG. 3 graphically shows dispersion relations for photons and surface plasmons in the optical frequency converter of FIG. 2.

FIG. 3 graphically shows dispersion relations for photons and surface plasmons in converter 200 of FIG. 2. The dispersion relationship for photons in optical waveguide 230 is given by Eq. (1):

$$E_p = \frac{ck}{\sqrt{\varepsilon_d}} \qquad (1)$$

where $E_P$ is the photon energy; c is the speed of light in vacuum; k is the momentum; and $\varepsilon_d$ is the dielectric constant of dielectric layer 204. If $\varepsilon_d$ depends on the frequency relatively weakly, then Eq. (1) describes a substantially linear dispersion relationship shown in FIG. 3 by a straight line 302.

The dispersion relationship for SPs in SP waveguide 220 is given by Eq. (2):

$$E_{sp} = ck\sqrt{\frac{\varepsilon_m + \varepsilon_d}{\varepsilon_m \varepsilon_d}} \qquad (2)$$

where $E_{sp}$ is the SP energy and $\varepsilon_m$ is the dielectric constant of the metal used in stripe 224. Unlike $\varepsilon_d$, $\varepsilon_n$ usually depends relatively strongly on the frequency, which causes the dispersion relationship for SPs to deviate significantly from a straight line. A representative dispersion curve corresponding to Eq. (2) is shown in FIG. 3 by a curve 304.

Conversion of an SP into a photon in the overlapping portions of SP waveguide 220 and optical waveguide 230 is constrained by energy and momentum conservation. In a medium that has a continuous translational symmetry (i.e., invariance under any translation in a given direction), SP-to-photon (SPP) conversions do not normally occur due to a large momentum mismatch between an SP and a photon of the same energy, which momentum mismatch is indicated in FIG. 3 by vector G. In contrast, in a medium that has a discrete translational symmetry (i.e., invariance under discrete or quantized translation in a given direction rather than under any continuous translation along the direction), SPP conversions can occur if the momentum mismatch is an integer multiple of the reciprocal lattice vector corresponding to the discrete translational symmetry. Converter 200 uses this property of discretely translationally symmetric media to enable nonlinear conversion of SPs guided by SP waveguide 220 into photons guided by optical waveguide 230.

Referring back to FIG. 2, converter 200 has a periodic structure 260 having a series of alternating slabs 262 and 264. In one embodiment, structure 260 extends vertically (i.e., in the Y direction) across dielectric layer 204 from a lower boundary 203 to an upper boundary 205. Structure 260 extends laterally (i.e., in the X direction) across core 234. In the longitudinal (i.e., Z) direction, structure 260 might have between about 100 and several thousands slabs 262 and 264. In an alternative embodiment, structure 260 might extend (i) laterally across the entire width of converter 200 and/or (ii) longitudinally across the entire length of the converter. In addition, a spatial period of periodic structure 260 might have more than two types of slabs.

In one embodiment, slabs 262 and 264 differ in that one or more components of their respective nonlinear susceptibility tensors, $\chi^{(NL)}$, have opposite polarities. For example, $\chi_{333}^{(2)}$ in slab 262 might be equal to $-\chi_{333}^{(2)}$ in slab 264, where the subscript denotes the Cartesian components of the electric fields and the parenthesized superscript denotes the second-order susceptibility. Such slabs 262 and 264 can be formed in dielectric layer 204, e.g., as described in U.S. Pat. No. 7,099,073, which is incorporated herein by reference in its entirety. In an alternative embodiment, structure 260 can be fabricated to impose a different type of suitable spatial modulation on the nonlinear susceptibility of core 234 along the Z direction to provide momentum-mismatch compensation (quasi-phase matching) for the SP wave(s) guided by SP waveguide 220 and the light beam guided by optical waveguide 230. One skilled in the art will appreciate that, in various embodiments, the spatial modulation imposed by structure 260 can be used to modulate one or more other appropriately selected components of nonlinear susceptibility tensor $\chi^{(NL)}$.

Widths $d_2$ and $d_4$ of slabs 262 and 264, respectively, are selected to provide appropriate quasi-phase matching for the SP wave(s) guided by SP waveguide 220 and the light beam guided by optical waveguide 230. In general, the relationship between widths $d_2$ and $d_4$ and the momentum mismatch ($\Delta k$) in the corresponding nonlinear optical process is given by Eq. (3):

$$D = d_2 + d_4 = \frac{2\pi h}{\Delta k} \qquad (3)$$

where h is the Planck's constant and D is the spatial period of structure 260. Each specific nonlinear optical process might have a different optimal set of widths $d_2$ and $d_4$, which also depends on the values of the coupled frequencies, e.g., $\omega_1$, $\omega_2$, and $\omega_3$ in FIG. 1. In one embodiment, $d_2=d_4=D/2$.

Suppose that the desired nonlinear optical process is second-harmonic generation, in which $\omega_3 = 2w_1$. Then, momentum mismatch $\Delta k$ is given by Eq. (4):

$$\Delta k = |k_p(2\omega_1) - 2k_{sp}(\omega_1)| \qquad (4)$$

where $k_p(2\omega_1)$ is the momentum of photons in optical waveguide 230 at the second-harmonic frequency (i.e., frequency $\omega_3 = 2\omega_1$), and $k_{sp}(\omega_1)$ is the momentum of SPs in SP waveguide 220 at the fundamental frequency (i.e., frequency $\omega_1$). Structure 260 whose spatial period is defined by Eqs. (3)-(4) enables efficient energy transfer from an SP wave of frequency $\omega_1$ to a light beam of frequency $\omega_3$ because it provides an appropriate momentum-mismatch compensation (quasi-phase matching) for the corresponding second-harmonic-generation process.

Alternatively, suppose that the desired nonlinear optical process is sum-frequency generation, in which $\omega_3 = \omega_1 + \omega_2$. Then, momentum mismatch $\Delta k$ is given by Eq. (5):

$$\Delta k = |k_p(\omega_1 + \omega_2) - k_{sp}(\omega_1) - k_{sp}(\omega_2)| \qquad (5)$$

where $k_p(\omega_1 + \omega_2)$ is the momentum of photons in optical waveguide 230 at the sum frequency (i.e., frequency $\omega_{3=\omega1+\omega2}$); $k_{sp}(\omega_1)$ is the momentum of SPs in SP waveguide 220 at frequency $\omega_1$; and $k_{sp}(\omega_2)$ is the momentum of SPs in SP waveguide 220 at frequency $\omega_2$. Structure 260 whose spatial period is defined by Eqs. (3) and (5) enables efficient energy transfer among SP waves of frequencies $\omega_1$ and $\omega_2$ and a light beam of frequency $\omega_3$ because it provides an appropriate momentum-mismatch compensation (quasi-phase matching) for the corresponding sum-frequency-generation process.

In general, from the present disclosure, one of ordinary skill in the art will be able to determine a proper spatial period for structure 260 based on Eq. (3) and an equation that is analogous to one of Eqs. (4)-(5) but corresponds to a desired nonlinear optical process. The resulting embodiment of structure 260 can enable efficient energy transfer from the SP wave(s) launched by PSP converter 210 into SP waveguide 220 to a light beam guided by optical waveguide 230 because it provides an appropriate momentum-mismatch compensation (quasi-phase matching) for the corresponding nonlinear optical process. Optical waveguide 230 will guide the light beam to end face 250, where it will exit converter 200 as output beam 232.

In certain embodiments, converter 200 can also be operated in a reverse mode, as opposed to the forward mode described above. More specifically, in a reverse mode of operation, converter 200 receives an input light beam at end face 250 and outputs an output light beam through PSP converter 210, which, in this case, operates as an SP-to-photon converter. For example, if converter 200 operating in a forward mode uses second-harmonic generation to double the input frequency (i.e., performs an $\omega \rightarrow 2\omega$ conversion), then the same converter 200 operating in a reverse mode can perform frequency down-conversion to halve the corresponding input frequency (i.e., to perform a $2\omega \rightarrow \omega$ conversion). Similarly, if converter 200 operating in a forward mode uses frequency down-conversion to halve the input frequency (i.e., performs a $2\omega \rightarrow \omega$ conversion), then the same converter 200 operating in the reverse mode can perform second-harmonic generation to double the corresponding input frequency (i.e., to perform an $\omega \rightarrow 2\omega$ conversion).

In various embodiments, dielectric layer 204 can be formed using one or more of lithium niobate, lithium tantalate, group III nitride (e.g., periodically polarization poled gallium nitride), and gallium arsenide. Metal stripe 224 can be formed using one or more of gold, silver, and aluminum. In general, any suitable dielectric material can be used to fabricate dielectric layer 204, with the term "dielectric," as used herein, covering both conventional dielectric materials and conventional semiconductor materials. Similarly, any suitable electrically conducting material, not necessarily a metal, can be used to make stripe 224.

While this invention has been described with reference to illustrative embodiments, this description is not intended to be construed in a limiting sense. Although optical frequency converters of the invention have been described in reference to optical waveguides having a semi-elliptical core buried in a planar dielectric layer, other core shapes and core/cladding configurations can also be used. Various modifications of the described embodiments, as well as other embodiments of the invention, which are apparent to persons skilled in the art to which the invention pertains are deemed to lie within the principle and scope of the invention as expressed in the following claims.

As used herein, the term "light" should be interpreted as covering electromagnetic waves in the ultraviolet, visible, infrared, far-infrared, and terahertz parts of the electromagnetic spectrum.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where substrate layer 202 is horizontal, but would be horizontal where the substrate layer is vertical, and so on. Similarly, while FIG. 2 shows the different layers as horizontal layers, such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A frequency-conversion method, comprising:
    guiding a surface-plasmon (SP) wave having at least a first frequency along an electrically conducting layer; and
    simultaneously guiding a light beam having a different second frequency along an optical waveguide having a waveguide core located next to or in contact with the electrically conducting layer, wherein the optical waveguide has a periodically spatially modulated nonlinear susceptibility along a propagation direction with periodicity that enables energy transfer between the first frequency of the SP wave and the second frequency of the light beam.

2. The method of claim 1, wherein the energy transfer occurs via one of second-harmonic generation, sum-frequency generation, difference-frequency generation, frequency down-conversion, four-wave mixing, and optical parametric conversion.

3. The method of claim 1, wherein the optical waveguide comprises a plurality of alternating first and second slabs in which the nonlinear susceptibility has opposite polarities, wherein the alternation of the first and second slabs provides the periodic spatial modulation of the nonlinear susceptibility in the optical waveguide.

4. The method of claim 1, further comprising:
    converting at least a portion of a pump light beam having the first frequency into the SP wave in a photon-to-SP converter coupled to a portion of the electrically conducting layer; and
    transmitting the light beam having the second frequency out of the waveguide core through an end face at a terminus of the optical waveguide.

5. The method of claim 4, further comprising generating the pump light beam using a light source.

6. The method of claim 1, further comprising:
coupling at least a portion of a pump light beam having the second frequency into the waveguide core through an end face of the optical waveguide to produce the light beam having the second frequency in the waveguide core; and
converting the SP wave into an output light beam having the first frequency in an SP-to-photon converter coupled to a portion of the electrically conducting layer.

7. The method of claim 6, further comprising generating the pump light beam using a light source.

8. The method of claim 1, wherein:
the SP wave has a third frequency that is different from the first frequency and the second frequency; and
the periodicity enables energy transfer among the first frequency of the SP wave, the second frequency of the light beam, and the third frequency of the SP wave.

9. The method of claim 1, wherein:
the light beam has a third frequency that is different from the first frequency and the second frequency; and
the periodicity enables energy transfer among the first frequency of the SP wave, the second frequency of the light beam, and the third frequency of the light beam.

10. A frequency-conversion method, comprising:
guiding a surface-plasmon (SP) wave having at least a first frequency along an electrically conducting layer; and
simultaneously guiding a light beam having a different second frequency along an optical waveguide having a waveguide core located next to or in contact with the electrically conducting layer, wherein:
the optical waveguide comprises a plurality of alternating first and second slabs in which a nonlinear susceptibility has opposite polarities; and
the alternation of the first and second slabs provides has spatial periodicity that enables energy transfer between the first frequency of the SP wave and the second frequency of the light beam.

11. A frequency-conversion method, comprising:
guiding a surface-plasmon (SP) wave having at least a first frequency along an electrically conducting layer; and
simultaneously guiding a light beam having a different second frequency along an optical waveguide having a waveguide core located next to or in contact with the electrically conducting layer, wherein the optical waveguide has a spatially modulated nonlinear susceptibility along a propagation direction that enables energy transfer between the first frequency of the SP wave and the second frequency of the light beam via at least one of second-harmonic generation, sum-frequency generation, difference-frequency generation, frequency down-conversion, four-wave mixing, and optical parametric conversion.

* * * * *